Nov. 10, 1953 — R. B. GIBSON — 2,658,508
BONE FRACTURE SPLINT
Filed Aug. 13, 1952

INVENTOR.
ROBERT B. GIBSON
BY
Oberlin & Limbach
ATTORNEYS.

Patented Nov. 10, 1953

2,658,508

UNITED STATES PATENT OFFICE 2,658,508

BONE FRACTURE SPLINT

Robert B. Gibson, Ponca City, Okla.

Application August 13, 1952, Serial No. 304,155

6 Claims. (Cl. 128—92)

This invention relates to a bone fracture splint of the type where a firm support is required while the bone fracture is healing.

More particularly this invention relates to a bone fracture splint of the type employing a supporting means which is securely placed immediately adjacent to the bone which has been fractured.

It is an object of the present invention to provide a new supporting means which may be used to firmly hold the broken bone in its set position during the time required for such bone to knit itself together.

A further object of this invention is to provide a less cumbersome splint than that customarily employed in long-bone fractures in the past. Furthermore, the splint of this invention permits its application in a more efficient and accurate manner so as to prevent accidental slippage between the fractured pieces of bone while they are knitting.

Other objects and advantages will become apparent as the following description proceeds.

To the accomplishment of the foregoing and related ends, the invention, then, comprises the features heerinafter fully described and particularly pointed out in the claims, the following description and the annexed drawings setting forth in detail certain illustrative embodiments of the invention, these being indicative, however, of but one of the various ways in which the principle of the invention may be employed.

Figure 1:
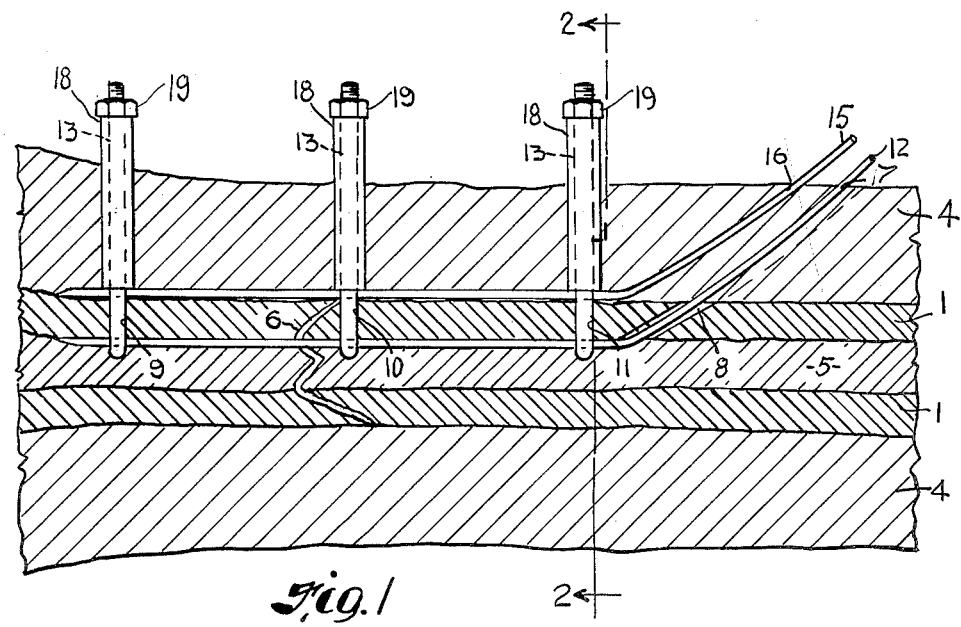
Fig. 1 is a cross-sectional view of a side elevation of a bone fracture splint as applied in practice.

With further reference to these drawings illustrating a preferred embodiment of my invention and illustrating the manner in which it is applied, as shown in Fig. 1, the reference numerals 1 designate a bone which is surrounded by flesh 4. In the center of the bone 1 is the matter commonly referred to as marrow 5. As illustrated in Fig. 1 the bone 1 is broken as shown at point 6. After the bone has been set, when the broken edges have been placed in correct alignment, an incision is made in the flesh at 7 and a slanting hole 8 is drilled through the shell of the bone 1 into the marrow 5. Next a plurality of holes indicated at 9, 10 and 11 are drilled radially through the shell of the bone in alignment with the slanting hole 8.

A spring steel wire 12 is then inserted through the slanting hole 8 and run along the inside of the bone 1 in the marrow 5 so as to bridge the fractured area indicated at 6.

Pins 13 are then inserted through holes 9, 10 and 11 and their hooked ends 14 are engaged over the wire 12.

A second wire 15 is then inserted through an opening made in the flesh at 16 and forced along the outside of the bone 1 through the slotted openings 17 in the pins 13. After the two wires 12 and 15 and the pins 13 have thus been positioned, an adjustable casing 18 is forced downwardly under the influence of the nuts 19 drawing the wires 12 and 15 together and thus keeping the bone in alignment during the healing period.

Figure 2:
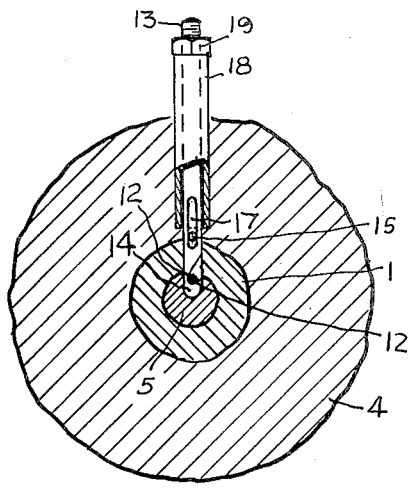
Fig. 2 is a cross-sectional view along line 2—2 of Fig. 1.

Referring more particularly to Fig. 2, there is illustrated my preferred embodiment of a holding pin which further illustrates the manner in which the wire 12 is positioned in the hooked end 14 of the pin 13.

Figure 3:
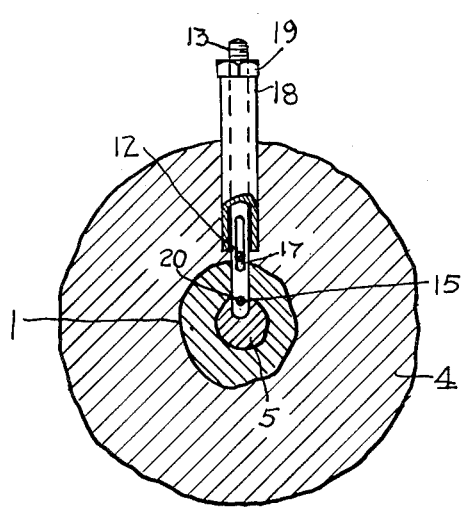
Fig. 3 is a cross-sectional view along the line 3—3 of Fig. 1.

Fig. 3 illustrates an alternative embodiment of my invention wherein the tip of the pin 13 employs a hole 20 through which the wire 12 may be inserted in place of my preferred embodiment shown in Fig. 2 which employs a hooked end 14.

After the bone has healed it is necessary only to back off the nuts 19, depress the pins 13 sufficiently to disengage the hooked ends 14 from the wire 12 whereupon the pins 13 are rotated 180° and withdrawn from the bone 1. The wires 12 and 15 are then withdrawn from the bone 1 by being pulled to the right as viewed in Fig. 1.

Should the alternative pin be employed, such as is illustrated in Fig. 3 it is necessary only to back off the nuts 19 after which the wires 12 and 15 may be withdrawn in a similar manner.

The bone fracture splint of my invention presents many advantages over fracture splints which have been used in the past. It is to be noted that my fracture splint firmly and rigidly holds the fractured pieces of bone in position while they are knitting and relative movement between these pieces of bone is virtually impossible after my splint has been applied. This firm support given at the point of fracture insures that while the bone is knitting there will be no relative movement between the pieces of bone which may necessitate the rebreaking and resetting of the same.

My bone fracture splint furthermore is one which may be accurately and speedily applied to the injured bone and I wish to further point out the rapid and efficient manner in which such splint may be removed after the healing has taken place. After the bone has knit, it is not necessary to reopen the flesh surrounding such bone injury, but as more particularly explained above, after loosening the adjustable pins, the wire supports may easily be removed through the holes through which the wires were originally inserted.

It will be observed that since the wire 12 is made of stainless steel its diameter may be very small and thus its presence in the medulary canal displaces very little of the medulary substance and accordingly does not interfere with the circulation.

The sleeve 18 affords excellent method of irrigating the bone with Dakins' or other antiseptic solution should there be any infection or tissue reaction present after pin 13 has been removed. This sleeve can be left in the wound for a few days and, with a Luer syringe, solution can be forced through it, the sleeve sitting directly over the hole in the bone. This solution will go through one of these and return through the other holes and afford adequate antiseptic treatment.

Other modes of applying the principle of the invention may be employed, change being made as regards the details described, provided the features stated in any of the following claims or the equivalent of such be employed.

I therefore particularly point out and distinctly claim as my invention:

1. As a bone fracture splint, an intra-osseous flexible member, an extra-osseous flexible member, and a plurality of pins firmly supporting and connecting such flexible members.

2. As a long-bone fracture splint, an intra-osseous flexible wire, an extra-osseous flexible wire, and a plurality of solid metallic pins mounted in an adjustable casing, which pins contain the means for firmly securing said wires to said pins.

3. A bone fracture splint assembly comprising two flexible wires adapted for positioning as an intra-osseous member and an extra-osseous member respectively, and a plurality of pins mounted in an adjustable sleeve and adapted to enter the marrow section of the fractured bone, said pins containing apertures adapted to firmly embrace such flexible wires.

4. A bone fracture splint assembly comprising two flexible wires adapted for positioning as an intra-osseous member and an extra-osseous member respectively, a plurality of pins adapted to enter the marrow section of the bone, each such pin containing both a hooked recess adapted to embrace said intra-osseous member and a hole through which the extra-osseous member passes, an adjustable sleeve telescopically mounted on each pin, and a nut threadably mounted on the end of each pin constantly urging said sleeve downward into firm contact with said extra-osseous member whereby said flexible wires are drawn into firm alignment.

5. A bone fracture splint assembly comprising two flexible wires adapted for positioning as intra-osseous and extra-osseous members respectively, a plurality of pins so formed as to removably grasp said intra-osseous wire and to maintain said extra-osseous wire in alignment therewith, a sleeve telescopically mounted on each pin and adapted to firmly contact said extra-osseous wire, and a nut threadably mounted on the end of each pin for engagement with the outer end of said sleeve, whereby said wires may be drawn toward each other while respectively bearing on the inner and outer surfaces of the bone to maintain the sections thereof in alignment.

6. A bone fracture splint assembly comprising two flexible wires adapted for positioning in substantial radial alignment as intra-osseous and extra-osseous members respectively, a plurality of pins terminally adapted for insertion radially into the bone, said pins so formed as to removably grasp said intra-osseous wire and to maintain said extra-osseous wire in alignment therewith, a sleeve telescopically mounted on each pin and at its inner end adapted to bear on said extra-osseous wire, and a nut threadably mounted on the end of each pin for engagement with the outer end of said sleeve, whereby said wires may be drawn toward each other while respectively bearing on the inner and outer surfaces of the bone to maintain the sections thereof in alignment.

ROBERT B. GIBSON.

No references cited.